United States Patent
Hiemeyer et al.

(10) Patent No.: US 10,661,498 B2
(45) Date of Patent: May 26, 2020

(54) METHOD FOR APPLYING A FILM ONTO A BODY

(71) Applicants: LIEBHERR-HAUSGERATE LIENZ GMBH, Lienz (AT); LIEBHERR-HAUSGERATE OCHSENHAUSEN GMBH, Ochsenhausen (DE)

(72) Inventors: Jochen Hiemeyer, Karlstadt (DE); Michael Freitag, Wurzburg (DE); Martin Kerstner, Wurzburg (DE)

(73) Assignees: LIEBHERR-HAUSGERATE LIENZ GMBH, Lienz (AT); LIEBHERR-HAUSGERATE OCHSENHAUSEN GMBH, Ochsenhausen (DE)

(*) Notice: Subject to any disclaimer, the term of this patent is extended or adjusted under 35 U.S.C. 154(b) by 32 days.

(21) Appl. No.: 15/545,329

(22) PCT Filed: Oct. 29, 2015

(86) PCT No.: PCT/EP2015/002166
§ 371 (c)(1),
(2) Date: Jul. 21, 2017

(87) PCT Pub. No.: WO2016/116118
PCT Pub. Date: Jul. 28, 2016

(65) Prior Publication Data
US 2018/0009156 A1    Jan. 11, 2018

(51) Int. Cl.
*B29C 65/78* (2006.01)
*B29C 65/48* (2006.01)
(Continued)

(52) U.S. Cl.
CPC .......... *B29C 63/0073* (2013.01); *B29C 63/02* (2013.01); *B29C 63/04* (2013.01);
(Continued)

(58) Field of Classification Search
CPC ....... B29C 63/20; B29C 63/185; B29C 63/22; B29C 63/0047; B29C 63/048;
(Continued)

(56) References Cited

U.S. PATENT DOCUMENTS 2,201,706 A * 5/1940 Sukohl .................. B29C 63/182
156/160
2,932,142 A * 4/1960 Sindzinski .............. B65B 43/26
53/386.1
(Continued)

FOREIGN PATENT DOCUMENTS

DE        29617600 U1    2/1997
DE     102013005585 A1    8/2014
(Continued)

OTHER PUBLICATIONS

International Search Report and Written Opinion issued in corresponding International Patent Application No. PCT/EP2015/002166 (with English translation of International Search Report) dated Apr. 20, 2016 (18 pages).

(Continued)

*Primary Examiner* — Philip C Tucker
*Assistant Examiner* — Brian R Slawski
(74) *Attorney, Agent, or Firm* — Kilyk & Bowersox, P.L.L.C.

(57) ABSTRACT

The present invention relates to a method of applying a film to a body. In this respect, a film is first applied to and positioned at a transfer mold and the body to be film coated is introduced into the transfer mold to which the film to be attached is applied or the transfer mold to which the film to (Continued)

Figure 1:
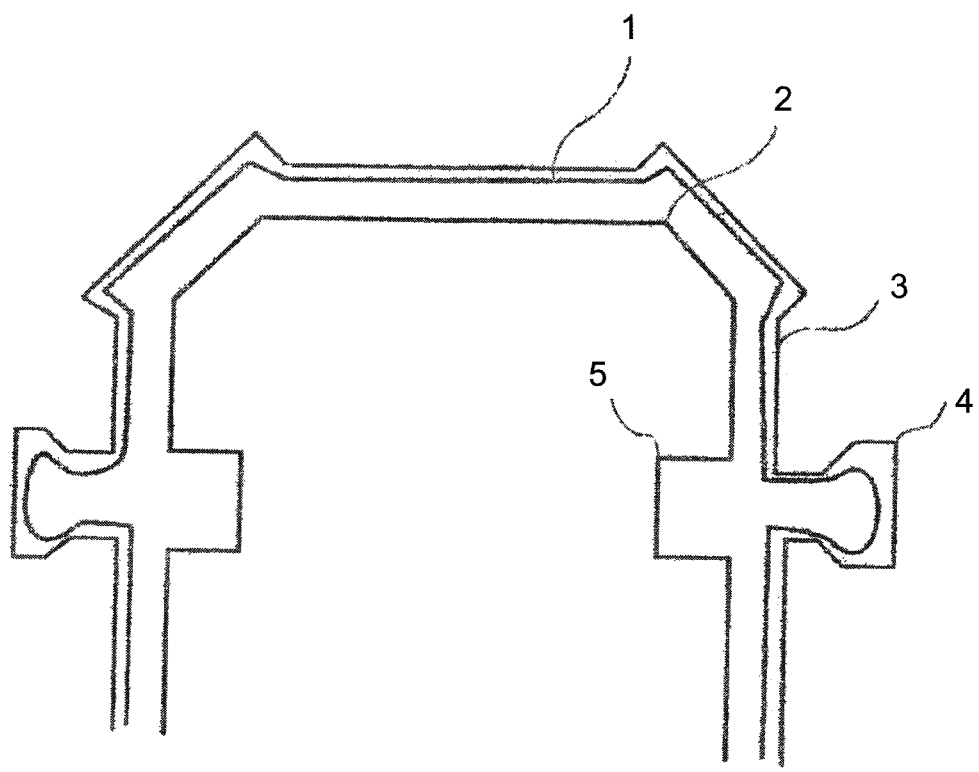

be attached is applied is introduced into the body to be film coated so that the film is located between the body and the transfer mold. In the further course, a vacuum is applied in a region between the body and the film and/or an excess pressure is applied in a region between the transfer mold and the film so that the film moves from the transfer mold onto the body. A particularly simple method that is fast to be carried out is thereby provided for applying a film to a surface.

7 Claims, 3 Drawing Sheets

(51) Int. Cl.
    *B29C 65/00*     (2006.01)
    *B29C 63/04*     (2006.01)
    *B29C 63/02*     (2006.01)
    *B29C 51/00*     (2006.01)
    *B29C 63/00*     (2006.01)
    *B32B 37/10*     (2006.01)
    *B32B 37/00*     (2006.01)
    *B32B 38/18*     (2006.01)
    *F25D 23/06*     (2006.01)
    *B29C 51/10*     (2006.01)
    *B29K 105/00*     (2006.01)
    *B29L 31/00*     (2006.01)

(52) U.S. Cl.
    CPC .............. *B29C 65/48* (2013.01); *F25D 23/06* (2013.01); *B29C 51/10* (2013.01); *B29C 63/025* (2013.01); *B29C 63/048* (2013.01); *B29C 2063/006* (2013.01); *B29C 2791/006* (2013.01); *B29K 2105/256* (2013.01); *B29L 2031/712* (2013.01); *B32B 37/1018* (2013.01); *B32B 38/1858* (2013.01); *B32B 2307/304* (2013.01); *F25D 2201/14* (2013.01); *F25D 2500/02* (2013.01)

(58) Field of Classification Search
    CPC .............. B29C 63/0094; B29C 63/025; B29C 2063/006; B29C 65/7847; B29C 51/10; B29C 2791/006; B29C 63/04; B32B 38/1858; B32B 37/1018; B32B 2307/304; B65B 31/024; B65B 43/26; F25D 2201/14; F25D 23/066; E04B 1/803; B29L 2031/7622; B25D 2201/14; F16L 59/065
    USPC ... 156/60, 80, 196, 212, 213, 214, 230, 232, 156/235, 241, 242, 247, 249, 285, 286, 156/287, 293, 303.1, 312; 428/69; 53/441; 62/440, 441, 447; 264/500, 510, 264/571
See application file for complete search history.

(56) References Cited

U.S. PATENT DOCUMENTS

| | | | | |
|---|---|---|---|---|
| 3,753,830 | A * | 8/1973 | Cruckshank | B29C 51/00 156/382 |
| 5,227,245 | A * | 7/1993 | Brands | B32B 27/36 428/483 |
| 5,900,299 | A * | 5/1999 | Wynne | B29C 44/1266 156/257 |
| 6,128,914 | A * | 10/2000 | Tamaoki | F25B 9/006 312/401 |
| 6,321,513 | B1 * | 11/2001 | Meixner | B65B 45/00 53/434 |
| 10,088,221 | B2 * | 10/2018 | Freitag | F25D 23/065 |
| 2003/0082357 | A1 * | 5/2003 | Gokay | B32B 3/04 428/212 |
| 2006/0243372 | A1 | 11/2006 | Huber | |
| 2013/0089696 | A1 * | 4/2013 | Pargeter | E04B 1/803 428/69 |
| 2014/0216100 | A1 * | 8/2014 | Toshimitsu | F16L 59/065 62/440 |
| 2015/0377546 | A1 | 12/2015 | Freitag et al. | |

FOREIGN PATENT DOCUMENTS

| | | | | |
|---|---|---|---|---|
| EP | 0442691 | A1 | 8/1991 | |
| EP | 1510747 | A1 | 3/2005 | |
| EP | 1719604 | A2 | 11/2006 | |
| EP | 2314518 | A1 * | 4/2011 | ............. B29C 63/22 |
| EP | 2765375 | A2 | 8/2014 | |
| JP | 58179614 | A * | 10/1983 | ............. B29C 63/22 |
| WO | 02/26475 | A2 | 8/2015 | |

OTHER PUBLICATIONS

Search Report issued in corresponding German Patent Application No. 10 2015 008 161.6 dated Aug. 26, 2015 (10 pages).

* cited by examiner

METHOD FOR APPLYING A FILM ONTO A BODY

This application is a National Stage Application of PCT/EP2015/002166, filed Oct. 29, 2015, which claims priority to German Patent Application No. 10 2015 000 822.6, filed Jan. 22, 2015, and German Patent Application No. 10 2015 008 161.6, filed Jun. 24, 2015, which are incorporated in their entireties by reference herein.

The present invention relates to a method of applying a film to a body as well as to a vacuum insulation body having a film that has been applied in accordance with the method of the invention. The present invention furthermore relates to a heat insulated receptacle and preferably to a refrigerator unit and/or a freezer unit that comprises a vacuum insulation body.

Vacuum insulation bodies are used, for example, in heat insulation in refrigerator units and freezer units. In this respect, a vacuum insulation body is arranged in the region between the outer jacket of the unit and the inner container to be cooled to achieve a sufficiently high thermal insulation between the outside and the inside of the unit to be insulated by means of the principle of vacuum thermal insulation.

A film like cover for a vacuum insulation body is described in the patent application DE 10 2013 005 585 that is characterized in that the cover prefabricated in bag form is used as a diffusion-tight cover that is preferably larger than the contour to be covered so that projecting or set back contours of a body to be covered can be covered or film-coated with the film-like cover.

A method can also be seen from this application how the film-like cover can be applied to the body to be covered. In this respect, the film-like cover prefabricated in bag shape is applied to the body to be covered by means of vacuum. Since the body to be covered or the film typically has adhesive surfaces for the covering, the problem occurs in this respect that the film adheres to the body in a non-dislocatable manner on a contact with the body. A readjustment of the film position on the body is thus not possible. A fast setting adhesive or a fast setting adhesive surface is nevertheless useful to enable a processing that is as fast as possible.

Figure 3:
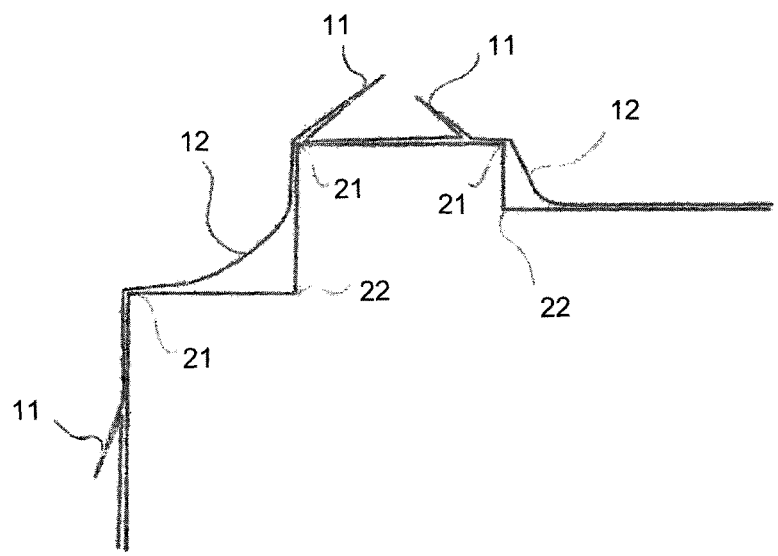

FIG. 3 in this respect shows the problems that occur in the prior art. On a pulling over of an over-large film sack and a subsequent application of a vacuum between the film and the body to be film coated, the problem in particular arises with concave or convex contours of the body that the film first comes into contact with the projecting contour sections and adheres to them. This has the result that a complete contact of the film in a concave part region of the body cannot be achieved despite a still present film surface. Tautened film regions 12 thus result in the region of a concave contour 22 of the body. The excess film that should actually have come into contact with the concave contour 22 of the body in contrast forms film folds 11.

These considerations are not restricted to refrigerator units and/or freezer units, but also apply to heat insulated receptacles in general.

Since damage to the film can particularly easily occur in the tautened film regions 12 and in the film folds 11, it is the object of the present invention to develop a method with which a film can be applied to a body in a particularly reliable manner even with convex or concave body shapes.

This object is achieved by the method for applying a film to a body having the features in accordance with claim 1. Provision is accordingly made that a film is applied to and positioned at a transfer mold, the body to be film coated is introduced into the transfer mold to which the film to be attached is applied or the transfer mold to which the film to be attached is applied is introduced into the body to be film coated so that the film is located between the body and the transfer mold. A vacuum is furthermore applied in a region between the body and the film and/or an excess pressure is applied in a region between the transfer mold and the film so that the film moves from the transfer mold onto the body.

It is ensured by the application and positioning of the film to and at a transfer mold that a contact with the body to be film coated only takes place after application of a vacuum between the body and the film and/or after application of an excess pressure between the transfer mold and the film provided that the positioning of the body and of the transfer mold is carried out carefully.

The film to be applied to the body is preferably a high barrier film. The term high barrier film is preferably to be understood as a cover or as a film by means of which the gas entry into a vacuum insulation body is reduced so much that the increase in the thermal conductivity due to the gas entry over its service life is sufficiently small. A time period of 15 years, preferably of 20 years, and particularly preferably of 30 years, is to be considered as the service life, for example. The increase in the thermal conductivity of the vacuum insulation body caused by gas entry is preferably less than 100%, and particularly preferably less than 50%, over its service life.

The surface-specific gas permeation rate of the high barrier film is preferably less than $10^{-5}$ mbar*l/s*m$^2$ and particularly preferably less than $10^{-6}$ mbar*l/s*m$^2$ (measured according to ASTM D-3985). This gas permeation rate applies to nitrogen and to oxygen. There are likewise low gas permeation rates for other types of gas (in particular steam), preferably in the range from less than $10^{-2}$ mbar*l/s*m$^2$ and particularly preferably in the range from less than $10^{-3}$ mbar*l/s*m$^2$ (measured according to ASTM F-1249-90). The aforesaid small increases in the thermal conductivity are preferably achieved by these small gas permeation rates.

A high barrier film preferably comprises a single-layer film or a multi-layer film (that is preferably sealable) having one or more barrier films (typically metal films or oxide films, with aluminum or an aluminum oxide typically being used as the metal or as the oxide respectively).

The above-named values or the make-up of the high barrier film are exemplary, preferred values which do not restrict the invention.

So that the film applied to the transfer mold moves onto the body to be film coated, a pressure difference is formed between the region of the film and the body and the region of the film and the transfer mold. The pressure difference is in this respect configured such that the film applied to the transfer mold is removed from it and moved in the direction of the body. A particularly simple application of a film to a body is thereby achieved.

The transfer mold preferably has a smooth surface so that a film contacting the transfer mold can be simply positioned. A manual repositioning of a film contacting the transfer mold can naturally also be considered in this respect.

In accordance with a further advantageous embodiment of the method in accordance with the invention, a vacuum is formed between the film and the transfer mold for applying and positioning the film to and at the transfer mold. A pressure difference is therefore provided in a space formed by the film and the transfer mold so that the film moves in the direction of the transfer mold. An adhesion of the film to the transfer mold is thereby insured in a simple manner. A peeling of a film once applied to the transfer mold is also countered by forming a vacuum between the film and the transfer mold so that the body to be film coated can already be brought into a direct vicinity of the transfer mold having the applied film without the film peeling from it in an unwanted manner and coming into contact with the body. A transition of the film onto the body to be film coated first takes place by a provision of a pressure difference that causes a movement of the film in the direction of the body.

In accordance with a further embodiment of the present invention, the body to be film coated is advantageously partly or completely provided with an adhesive layer at its surfaces to be film coated before a transfer of the film to the body and/or the side of the film contacting the body is partly or completely provided with an adhesive layer at its surfaces contacting the body before a transfer of the film to the body.

The provision of an adhesive layer results in a fast processing and a long-term connection of the film to the body. To further increase the processing speed, it is expedient to use a fast-setting adhesive for the adhesive layer. In this respect, the adhesive layer is located both on the body to be film coated and on the film to be applied to the body. A combination of adhesive layer on the body and of adhesive player on the film is also possible.

The adhesive layer is, however, preferably applied to the body to be film coated since it, unlike the film, has a rigid base structure on which the application of an adhesive layer can be implemented more easily.

It is also conceivable that with a two-component adhesive one of the two components is present on the side of the film contacting the body and the other one of the two components is applied to the surface of the body to be film coated. The advantage is obtained in this respect that the two components do not develop any adhesive effect before being brought into contact with one another and the processing of the corresponding components can be carried out more easily.

In a further advantageous embodiment of the present method, the transfer mold has at a surface of the body to be film located that has an elevated portion and/or a recess a recess contrary thereto. In addition, the body is aligned with respect to the transfer mold before a transfer of the film to the body such that respective corresponding pairs of an elevated portion and/or of a recess of the body and of a recess of the transfer mold are aligned with respect to one another.

This means that with a recess of the surface of the body to be film coated, the transfer mold has a corresponding recess so that the region formed by the body and the transfer mold widens at this position both due to the body and due to the transfer mold. This describes a corresponding pairing of a recess of body and transfer mold and also defines a contrary recess that the transfer mold has with respect to a recess of the surface of the body to be film coated. A recess of the transfer mold is therefore provided at a recess of the body to film coated (concave contour). These two contours accordingly project from one another.

If a corresponding pairing of a recess of a body and of a transfer mold is brought into a mutually aligned position before the film moves from the transfer mold to the body, the recess in a surface of the body can be completely covered with film on the transfer procedure of the film from the transfer mold to the body without the parts of the body in the recess not being able to be covered by a film.

A film is preferably also provided in a recess of the transfer mold that can then be applied in the contour of the body formed contrary thereto.

In accordance with a further advantageous embodiment of the method in accordance with the invention, the film for application to the body has a bag-shaped base structure and is preferably a high barrier film.

Both the application of the film to a transfer mold and the transfer to the body to be film coated can be performed particularly simply due to the bag-shaped base structure of the film.

The film for application to the body is preferably larger than the surfaces of the body to be film coated. It is thereby ensured that a sufficient amount of film is present to cover the total surface of the body to be film coated. No stresses are thus furthermore formed in the film applied to the body, whereby regions of the body that are not covered by film are minimized.

In accordance with a further advantageous embodiment of the present method, the transfer mold can completely receive the body to be film coated in an opening or the body to be film coated can completely receive the transfer mold in an opening. This describes a particularly simple embodiment of the method in which large surfaces of a body to be film coated can effectively be provided with film in an efficient manner.

Provision is made in an embodiment that the body to be film coated is the inner container of a heat-insulated receptacle and preferably the inner container of a refrigerator unit and/or a freezer unit. Different embodiments of such receptacles and units covered by the invention will be described in detail further below.

The present invention furthermore relates to a vacuum insulation body that has a film, preferably a high barrier film that has been attached to the body to be film coated in accordance with one of the embodiments of the method in accordance with the invention described above.

A core material of the vacuum insulation body in this respect advantageously comprises a bulk powder that is covered in a diffusion-tight manner by the film. In this respect, the film has folds projecting in the direction of the core material.

The folds projecting in the direction of the core material result from an application of one of the embodiments of the method for applying a film onto a body.

The present invention furthermore relates to a heat insulated receptacle, preferably to a refrigerator unit and/or a freezer unit, that contains at least one vacuum insulation body that has been produced with the aid of one of the methods described above.

The invention furthermore relates to a heat insulated receptacle, preferably to a refrigerator unit and/or a freezer unit, having at least one carcass and having at least one temperature-controlled and preferably cooled inner space that is surrounded by the carcass and having at least one closure element by means of which the temperature-controlled and preferably cooled inner space is closable, wherein at least one intermediate space is located between the temperature-controlled and preferably cooled inner space and the outer wall of the receptacle or of the unit, wherein at least one vacuum insulation body having an evacuated region surrounded by a film and filled with core material is arranged in the intermediate space; and wherein at least one section of the film was applied to the inner container of the receptacle or of the unit within the framework of a method in accordance with the invention.

An embodiment in which the vacuum insulation body forms a full vacuum system is particularly preferred in connection with heat insulating receptacles or refrigerator units and/or freezer units in accordance with the invention.

A heat insulation is to be understood by this which comprises only or primarily an evacuated region which is filled with a core material. Only such a vacuum insulation body can thus be present between the inner wall and the outer wall of the receptacle or unit which has a region which is surrounded by a vacuum-tight film, in which there is a vacuum and in which a core material is arranged. A foaming and/or a vacuum insulation panel is/are preferably not provided as heat insulation or another heat insulation is not provided, except for the full vacuum system between the inner side and the outer side of the receptacle or unit.

This preferred form of heat insulation in the form of a full vacuum system can extend between the wall bounding the inner space and the outer wall of the carcass and/or between the inner side and the outer side of the closure element such as a door, flap, cover, or the like.

The full vacuum system can be obtained such that a covering of a gas-tight film is filled with a core material and is subsequently sealed in a vacuum-tight manner. In an embodiment, both the filling and the vacuum-tight sealing of the covering take place at normal or environmental pressure. The evacuation then takes place by the connection to a vacuum pump of a suitable interface worked into the covering, for example an evacuation stub which can have a valve. Normal or environmental pressure is preferably present outside the covering during the evacuation. In this embodiment, it is preferably not necessary at any time of the manufacture to introduce the covering into a vacuum chamber. A vacuum chamber can be dispensed with in an embodiment to this extent during the manufacture of the vacuum insulation.

The temperature-controlled inner space is either cooled or heated depending on the type of the unit (refrigerator unit, heating cabinet, etc.) Heat insulated receptacles in the sense of the present invention have at least one temperature-controlled inner space, with this being able to be cooled or heated so that a temperature results in the inner space below or above the environmental temperature of e.g. 21° C. The invention is therefore not restricted to refrigerator units and/or freezer units, but rather generally applies to units having a temperature-controlled inner space, for example also to heat cabinets or heat chests.

Provision is made in an embodiment that the receptacle in accordance with the invention is a refrigerator unit and/or a freezer unit, in particular a domestic appliance or a commercial refrigerator. Such units are, for example, covered which are designed for a stationary arrangement at a home, in a hotel room, in a commercial kitchen or in a bar. It can, for example, be a wine cooler. Chest refrigerators and/or freezers are furthermore also covered by the invention. The units in accordance with the invention can have an interface for connection to a power supply, in particular to a domestic mains supply (e.g. a plug) and/or can have a standing aid or installation aid such as adjustment feet or an interface for fixing within a furniture niche. The unit can, for example, be a built-in unit or also a stand-alone unit.

The receptacle or the unit is preferably configured such that it can be operated at an AC voltage such as a domestic mains voltage of e.g. 120 V and 60 Hz or of 230 V and 50 Hz. It is conceivable in an alternative embodiment that the receptacle or the unit is configured such that it can be operated with DC current of a voltage of, for example, 5 V, 12 V or 24 V. Provision can be made in this embodiment that a plug power supply is provided inside or outside the unit via which the unit is operated. Operation with DC voltage can in particular be used when the receptacle has a thermoelectric heat pump for controlling the temperature of the inner space.

Provision can in particular be made that the refrigerator unit and/or freezer unit has/have a cabinet-type design and has/have a useful space which is accessible to a user at its front side (at the upper side in the case of a chest). The useful space can be divided into a plurality of compartments which are all operated at the same temperature or at different temperatures. Alternatively, only one compartment can be provided. Storage aids such as trays, drawers or bottle-holders (also dividers in the case of a chest) can also be provided within the useful space or within a compartment to ensure an ideal storage of refrigerated goods or frozen goods and an ideal use of the space.

The useful space can be closed by at least one door pivotable about a vertical axis. In the case of a chest, a lid pivotable about a horizontal axis or a sliding lid is conceivable as the closing element. The door or another closing element can be connected in a substantially airtight manner to the carcass by a peripheral magnetic seal in the closed state. The door or another closing element is preferably also heat insulated, with the heat insulation being able to be achieved by a foaming and optionally by vacuum insulation panels or also preferably by a vacuum system and particularly preferably by a full vacuum system. Door storage areas can optionally be provided at the inside of the door in order also to be able to store refrigerated goods there.

It can be a small appliance in an embodiment. In such units, the useful space defined by the inner wall of the container has, for example, a volume of less than $0.5 \text{ m}^3$, less than $0.4 \text{ m}^3$ or less than $0.3 \text{ m}^3$. The outer dimensions of the container or unit are preferably in the range up to 1 m with respect to the height, width and depth.

However, the transfer to an auxiliary mold that does not represent the cover body itself, but rather only maps the contour of the later cover body, is also covered by the invention. A vacuum insulation body can be molded to such an auxiliary mold that is connected to the cover body by a thin adhesive layer on completion of the evacuation procedure. This is, for example, but not exclusively, possible for an areal vacuum contour body, e.g. for use in a refrigeration unit door.

In accordance with the invention, the cover is in particular used for a vacuum insulation element in which indentations or dimples are present that have a rectangular outline. This can e.g. also be a complete receptacle composed of a vacuum insulation body in which in the simplest case of a rectangular receptacle the inner space is understood as an indentation into the covering cuboid. With such an indentation having a rectangular outline, a film fold proves to be expedient in which film folds project into the later insulation space in the corner regions. This easily understandable kind of film fold at the corner regions can, however, also be seen in general terms as a product feature of a vacuum insulation body manufactured in accordance with the method in accordance with the invention. The feature is in this respect a film fold that projects into the bulk powder of the core material.

Figure 2:
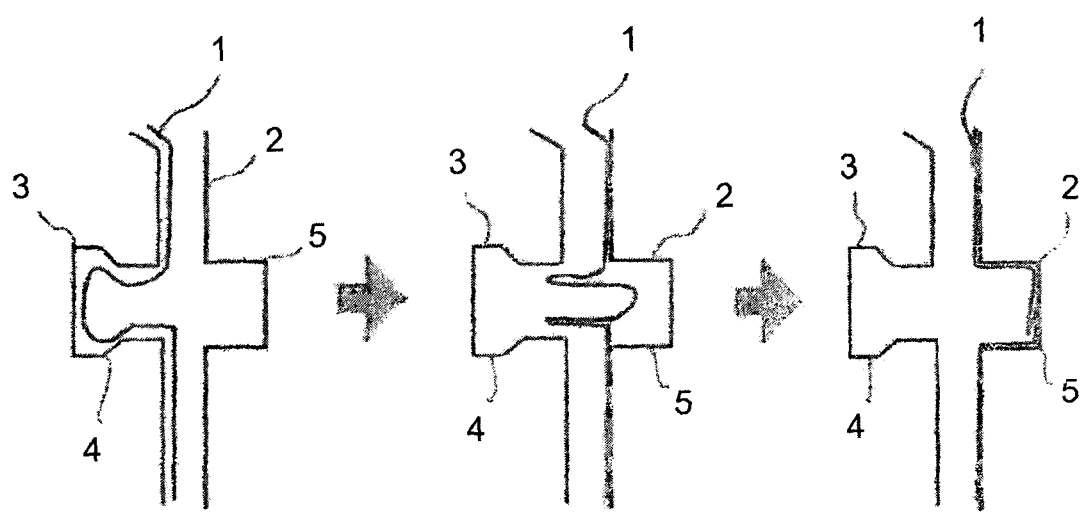

Further details of the invention will be explained with reference to drawings described in detail in the following. There are shown:

FIG. 1: a sectional view of a transform mold which a film contacts and into which a body to be film coated is introduced;

FIG. 2: the procedure of a film transfer in the region of a recess of the body to be film coated; and FIG. 3: the result of an application of a film to a body in accordance with a conventional method.

FIG. 3 shows the result of a method of applying a film to a body in accordance with the prior art. In this respect, a film is pulled over a body provided with adhesive and a vacuum is generated between the film and the body for applying the film. Since the adhesive on the body no longer permits a dislocation of the film after a contact with the film, regions form in recesses 22 of the body (concave contours) in which the film is not completely in contact with the body. Tautened regions 12 of the film are rather formed that result in the region of recesses 22 (concave contours) of the body. Since the total surface of the film to be applied to the body has, however, typically been dimensioned as sufficiently large to cover all the surfaces of the body, a material excess is produced due to the tautened surfaces 12 of the film that is expressed in the formation of film folds 11. Tautened surfaces 12 of the film are additionally also typically formed in the vicinity of elevated portions 21 (convex contours) of the body.

Since these tautened surfaces 12 and the film folds 11 represent an obstacle to the further processing of a body provided with film and are additionally very prone to damage, tautened surfaces of the film should generally be avoided. In this respect, special attention is placed on the tautened surfaces 12 of the film since they are very specifically prone to damage of the film on a small force application.

FIG. 1 shows a transfer mold 3 to which a film 1 has been applied. A body 2 has furthermore been introduced into the transfer mold 3 so that a film 1 is arranged between the body 2 and the transfer mold 3. A recess (concave contour) of the body 2 and a cutout 4 corresponding thereto in the transfer mold 3 can furthermore be recognized that is oriented opposite the recess 5 of the body 2. It can also be recognized that the film is also present in a part of this cut-out 4 of the transfer mold 3.

The film 1 is typically applied to the transfer mold by applying a vacuum between the region of the film 1 and the transfer mold 3. It is thus ensured that a body 2 provided with an adhesive, for example, does not come into contact with the film in an unwanted manner. As long as a sufficient distance from the transfer mold 3 is observed.

FIG. 2 shows a transfer of the film 1 from the transfer mold 3 to the body 2.

The film 1 is still applied to the transfer mold 3 in the left of the three illustrations of FIG. 2. The center representation shows a state of the film in which the latter has not yet completely come into contact with all the surfaces of the body 2. In this condition, however, a pressure difference between the regions of the film and the transfer mold 3 and the film 1 and the body 2 has already been applied such that the film 1 peels off the transfer mold 3 and moves in the direction of the body 2. An excess film provided in a cut-out 4 of the transfer mold 3 is being applied in the direction of the recess (concave contour) 5 of the body 2.

The result of the method in accordance with the invention can be seen in the right illustration of FIG. 2 in which no surfaces tautened by the film are present in a recess (concave contour) 5 of the body 2. The film 1 rather completely contacts all the surfaces formed by the body 2.

The invention claimed is:

1. A method of manufacturing a refrigeration unit, which is a refrigerator, a freezer, or a refrigerator-freezer combination, said refrigeration unit having a carcass having an outer wall, an inner container, and a vacuum insulation body that comprises a gas-tight barrier film and a core material, wherein the gas-tight barrier film is attached to an outer surface of the inner container, and the vacuum insulation body is confined against the outer surface of the inner container with the gas-tight barrier film in contact with the outer surface of the inner container, the method comprising:

(1) applying the gas-tight barrier film to an inner surface of a transfer mold;

(2) forming a vacuum between the gas-tight barrier film and the transfer mold to hold the gas-tight barrier film in position on the inner surface of the transfer mold;

(3) introducing the inner container of the refrigeration unit into the transfer mold so that the gas-tight barrier film is located between the outer surface of the inner container and the inner surface of the transfer mold;

(4) applying a vacuum in a space between the outer surface of the inner container and the gas-tight barrier film;

(5) relaxing the vacuum between the gas-tight barrier film and the transfer mold so that the gas-tight barrier film is transferred from the inner surface of the transfer mold to the outer surface of the inner container;

(6) removing the transfer mold from the inner container with said gas-tight barrier film; and (7) forming the vacuum insulation body between the inner container and the outer wall by filling the core material in a gas-tight envelope that is in part formed by the gas-tight barrier film attached to the outer surface of the inner container.

2. The method in accordance with claim 1, further comprising, before said (4) applying:

partly or completely providing the outer surface of the inner container with an adhesive layer; or partly or completely providing a surface of a side of the gas-tight barrier film contacting the outer surface of the inner container with an adhesive layer; or partly or completely providing the outer surface of the inner container with an adhesive layer and partly or completely providing the surface of the side of the gas-tight barrier film contacting the outer surface of the inner container with an adhesive layer.

3. The method in accordance with claim 1, wherein the transfer mold has, at a surface of the inner container that has an elevated portion and/or a recess, a recess contrary thereto; and wherein the inner container is oriented with respect to the transfer mold before said (4) applying and said (5) relaxing such that respective corresponding pairs of an elevated portion and/or recess of the inner container and a recess of the transfer mold are aligned with one another.

4. The method in accordance with claim 1, wherein the gas-tight barrier film has a bag-shaped base structure.

5. The method of claim 4, wherein the gas-tight barrier film is a high barrier film.

6. The method in accordance with claim 1, wherein the gas-tight barrier film is larger than the surfaces of the inner container to be film coated.

7. The method of claim 1, wherein said refrigeration unit has a temperature-controlled inner space that is surrounded by said carcass and having an intermediate space located between the temperature-controlled inner space and the outer wall of the carcass, said method forming said vacuum insulation body with said gas-tight barrier film in said intermediate space to provide said refrigeration unit.

* * * * *